United States Patent [19]

Facchin

[11] Patent Number: 5,417,373
[45] Date of Patent: May 23, 1995

[54] ELECTROMAGNET FOR VALVES

[75] Inventor: Alessandro Facchin, Pisa, Italy

[73] Assignee: Siemens Automotive L.P., Auburn Hills, Mich.

[21] Appl. No.: 194,541

[22] Filed: Feb. 10, 1994

[51] Int. Cl.⁶ ............................................. F02M 51/06
[52] U.S. Cl. .............................. 239/585.3; 251/129.16
[58] Field of Search .......................... 239/585.1–585.5; 251/129.15, 129.16, 129.18

[56] References Cited

U.S. PATENT DOCUMENTS

| 4,690,373 | 9/1987 | Linder et al. | 239/585.4 |
| 5,192,048 | 3/1993 | Wakeman | 239/585.5 |

FOREIGN PATENT DOCUMENTS

| 304744 | 3/1989 | European Pat. Off. | 239/585.5 |
| 2148388 | 5/1985 | United Kingdom | 239/585.4 |

*Primary Examiner*—Karen B. Merritt
*Attorney, Agent, or Firm*—Russel C. Wells; George L. Boller

[57] ABSTRACT

Magnetic force is increased for faster opening by providing two axial gaps, namely a radially inner gap and a radially outer gap, between the stator and the armature. When the fuel injector opens, impact of the armature with the stator occurs at the inner gap. The maximum radial extent of the armature is less than the radial dimension of the stator housing cavity containing the solenoid coil. The outer gap is defined between the margin of a magnetic pole washer that surrounds a central through-hole in the pole washer and a circular flange of the armature. The inner gap is defined between a ring-shaped upper end face of the armature and a ring-shaped lower end face of a tubular central magnetic pole that extends coaxially through the stator housing to the vicinity of the through-hole in the magnetic pole washer. The portion of the armature that contains the armature's ring-shaped upper end face protrudes through the central through-hole in the pole washer to confront the lower end face of the central magnetic pole.

10 Claims, 2 Drawing Sheets

ELECTROMAGNET FOR VALVES

FIELD OF THE INVENTION

This invention relates to an electrovalve for fuel injection and particularly to an electrovalve for high pressure, direct fuel injection into a combustion chamber of a spark-ignition internal combustion engine that operates on either a two-stroke or a four stroke cycle.

BACKGROUND AND SUMMARY OF THE INVENTION

A two-stroke engine that has a carbureted fuel system is, on the one hand, typically beset by the disadvantages of poor fuel economy and unacceptable exhaust emissions due in large part to co-mingling of a portion of an unburned fresh charge with exhaust products of the burnt charge being scavenged. On the other hand, this type of engine has the advantages of inherent simplicity and large power-to-weight ratio which make it particularly suitable for small and light engines, both for sea and land vehicles. Replacement of the carburetor by electronic fuel injection provides an exactly timed fuel feed that can dramatically reduce the above mentioned problems because it allows scavenging to be carried out before fuel is introduced into the combustion chamber.

Two important considerations for a fuel injection system are: (1) the timing (there is typically less than 5 milliseconds to inject the fuel), and (2) the quality of the injected fuel spray (which must be well atomized to reduce exhaust emissions). Various solutions have been proposed in attempts to meet both timing and spray objectives. Some combine pneumatic and hydraulic devices, with one system using air compressed at medium pressure (less than 10 bar) in order to atomize and carry into the combustion chamber fuel metered by a conventional low pressure injector into a prechamber. An additional special electrovalve is still needed in order to inject the atomized fuel/air mixture into the combustion chamber. Another solution (only used for small engines) uses air compressed at low pressure directly in the crankcase. The mixture is prepared in a Venturi-shaped prechamber, communicating with the cylinder head via a normal intake valve. The fuel is injected into the Venturi-shaped prechamber by a conventional low pressure injector and is atomized and carried into the combustion chamber when the intake valve opens.

The most promising system for automotive engines, from both exhaust emissions and vehicle driveability points of view, is electronic direct injection, to which the present invention is related. Such a solution, due to the very short allowable time for an injection, (about 3 msec max.), requires extremely fast valve actuation. The linear flow range must be very large ($>10$ for 3 msec period) in order to encompass both minimum and maximum injected fuel requirements, and so this makes the minimum linear pulse width very short ($<0.5$ ms). These requirements are very difficult to obtain due to the high injection pressure (also $>100$ bar) needed for good fuel atomization. Additional difficulty is due to resistance to high temperature that a device directly faced to a combustion chamber must satisfy.

A fuel injector having the above characteristics can also be used for the direct injection of fuel into a four-stroke, spark-ignited engine and such an application is very promising due to the reduction of the pollutants that can be obtained.

It is evident from the previous considerations that a very powerful magnet is needed in order to actuate a valve with the required speed characteristics. It is well known that one of the most widely adopted solutions is a double axial gap magnet in which the magnetic flux path is formed by a stator composed of a central core surrounded by a solenoid and by an external housing and facing through two axial gaps, a large disk-shaped armature connected to a valve needle. When the solenoid is energized, the magnetic flux tries to reduce the gaps, thereby creating two axial magnetic forces.

Such a configuration has the following disadvantages:

(1) large mass of the armature, which increases the actuation times;
(2) relatively small flexural stiffness, which can affect the vibrational behavior of the armature occurring after the contact with the movement stops, increasing the risk of bounces and therefore of extra fuel sprays;
(3) large hydraulic resistance during the motion, due to the large cross section of the moving device; and
(4) large sensitivity to geometric and positional tolerances.

In fact, error in perpendicularity between the stator and the armature is amplified at the outer diameter of the armature. If contact of the armature with the stator is designed to be at or near the outside diameter of the armature, and there is significant error in perpendicularity of the armature, such contact will be restricted to a small surface area of the total circumference, which then becomes overstressed. If, on the contrary, the contact is designed to be closer to the center, a large residual gap must be left near the outside diameter, in order to avoid undesired contact, and that size of gap decreases the magnetic force during the actuation.

Another known solution that provides fast injector response is reduction of the eddy currents in the magnet. This is obtained by a laminated or powdered metal flux path, but this is often complicated and expensive, and generally needs large cross sections in order to have sufficient forces.

The objective of the present invention is to provide an electromagnetic valve for fuel injection offering the following advantages:

(1) small radial dimensions and mass of the armature for a very fast actuation;
(2) high flexural stiffness of the armature, for low risk of bounces;
(3) producability with standard machining techniques and easy assembly for a low cost; and
(4) large axial magnetic forces.

This objective, with a simple and economic approach, has been met by an embodiment comprising:

A) an external housing for providing a cavity;
B) a solenoid coil disposed within said cavity;
C) a magnetic circuit that conducts magnetic flux produced by energization of said solenoid coil and comprises,
  i) a ferromagnetic stator, and
  ii) a ferromagnetic armature that executes longitudinal reciprocation relative to said stator in response to the energization and de-energization of said solenoid coil;
D) valve means that is operated by the longitudinal reciprocation of said ferromagnetic armature to open and close a flow path through the fuel injector;
E) said stator comprising,
  i) a ferromagnetic pole washer that is toward said armature and that has a through-hole at its center, and
  ii) a central magnetic pole comprising a through-bore extending coaxially within said housing to terminate in a downwardly facing ring-shaped end face proximate and coaxial with the through-hole in said pole washer;
F) an adjusting pin and an elastic biasing means disposed within said through-bore of said central magnetic pole such that said elastic biasing means is disposed between said adjusting pin and said armature, and said adjusting pin is positionable axially within said through-bore to set the force exerted by said elastic biasing means on said armature;
G) said armature comprising,
  i) an upwardly facing ring-shaped face proximate and coaxially facing the downwardly facing ring-shaped end face of said central magnetic pole, and
  ii) a further upwardly facing ring-shaped face proximate and coaxially facing a ring-shaped margin of a downwardly facing surface of said pole washer surrounding the through-hole in said pole washer,
H) said armature being moved coaxially toward said stator upon energization of said solenoid coil; characterized in that:
I) said upwardly facing ring-shaped end face of said armature and said downwardly facing ring-shaped end face of said central magnetic pole define a first axial gap between said stator and said armature:
J) said further upwardly facing ring-shaped face of said armature and said ring-shaped margin of said downwardly facing surface of said pole washer surrounding the through-hole in said pole washer define a second axial gap between said stator and said armature such that said axial gaps tend to reduce upon energization of said solenoid coil;
K) the maximum radial dimension of said armature from said longitudinal axis is substantially less than the radial dimension of said cavity within which said solenoid coil is disposed; and
L) motion of said armature toward said stator is arrested by abutment of said upwardly facing ring-shaped face of said armature with said downwardly facing ring-shaped end face of said central magnetic pole and not by abutment of said further upwardly facing ring-shaped face of said armature with said ring-shaped margin of said downwardly facing surface of said pole washer surrounding the through-hole in said pole washer.

The invention is also characterized in that:
said pole washer is disposed perpendicular to said longitudinal axis of the fuel injector;
said further upwardly facing ring-shaped face of said armature is on a flange of said armature that is perpendicular to said longitudinal axis;
the magnetic circuit reluctance of said first axial gap is substantially equal to that of said second axial gap;
the magnetic circuit reluctance between said pole washer and said central magnetic pole at the region of said end face of said central magnetic pole and the through-hole in said pole washer is at least ten times greater than that at said first axial gap and at least ten times greater than that at said second axial gap;
thin layers of harder plating covering those portions of said central magnetic pole and said armature that abut each other for imparting increased impact resistance to those portions and for also guaranteeing a residual actual gap in the magnetic circuit when those two portions are in abutment with each other;
said pole washer can be either an integral part of said housing or a separate part that is assembled into said housing; and
the housing can be either ferromagnetic to form a portion of the stator or non-ferromagnetic to form no portion of the stator.

The features of the invention will become more apparent from the following detailed description of the presently preferred embodiments, with reference to the attached drawings which are representative examples of the invention.

DETAILED DESCRIPTION OF THE PREFERRED EMBODIMENT

Figure 1:
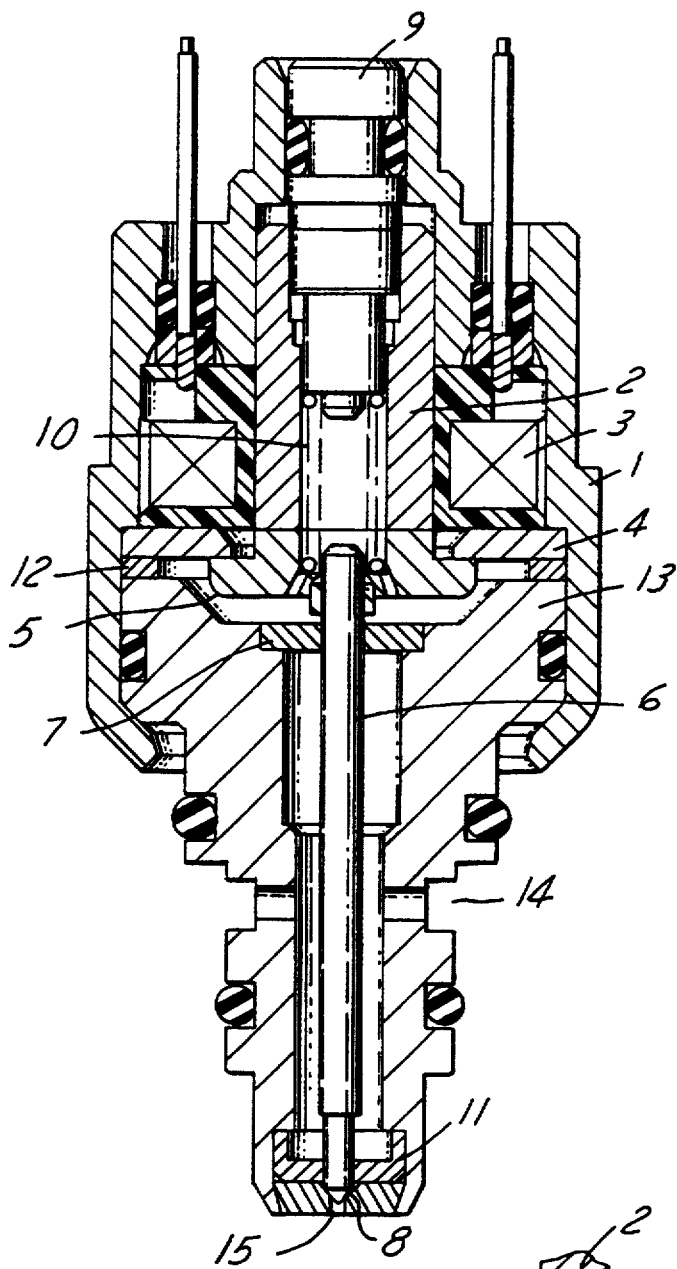
FIG. 1 is an axial sectional view through a fuel injector showing an embodiment of the invention in a condition of no injection.
Figure 5:
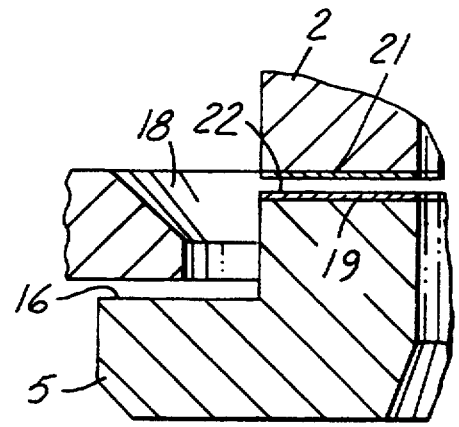
FIG. 5 is an expanded view of the area within the circle of FIG. 2.

FIG. 1 shows an electromagnetic high pressure valve for direct injection of fuel into a combustion chamber of an internal combustion engine, the engine not being shown. This fuel injector comprises a magnetic external housing 1 which, with a central magnetic pole 2, rigidly connected to said housing and protruding coaxially of the housing toward a magnetic pole washer 4, defines a cavity for a solenoid coil 3. Pole washer 4, in the configuration of FIG. 1, is a separate part that is assembled into housing 1 after the insertion of coil 3. When assembled, pole washer 4 is perpendicular to the longitudinal axis of the fuel injector and abuts an internal shoulder of housing 1.

A magnetic armature 5 is perpendicular to the longitudinal axis of the fuel injector and has a smaller end facing central magnetic pole 2 and larger, flange-shaped end facing pole washer 4. Armature 5 is rigidly connected to a needle 6 which is guided by annular guides 7, 11 firmly located in a central bore of a valve body 13 of the fuel injector. Elastic biasing means 10 (a spring) is located inside the through-bore of central pole 2, pushing armature 5 so that, when coil 3 is not energized, a tip of needle 6 is in contact with a conical cavity in a seat 8 to close a nozzle 15 preventing fuel from being sprayed. The fuel injector embodiment of FIG. 1 is a bottom-feed design having an inlet port 14 at which high pressure fuel enters a passage leading to seat 8.

A cylindrical adjusting pin 9 is slidably located in the through-bore of central magnetic pole 2 and has an end in contact with elastic biasing means 10, so that its position with respect to central magnetic pole 2 can change the biasing force that acts on armature 5. Valve body 13 is attached to housing 1 (by crimping, for example) in a way that tightly holds pole washer 4 and a ring 12. Ring 12 has suitable thickness in order to set the desired lift of the armature.

Figure 2:
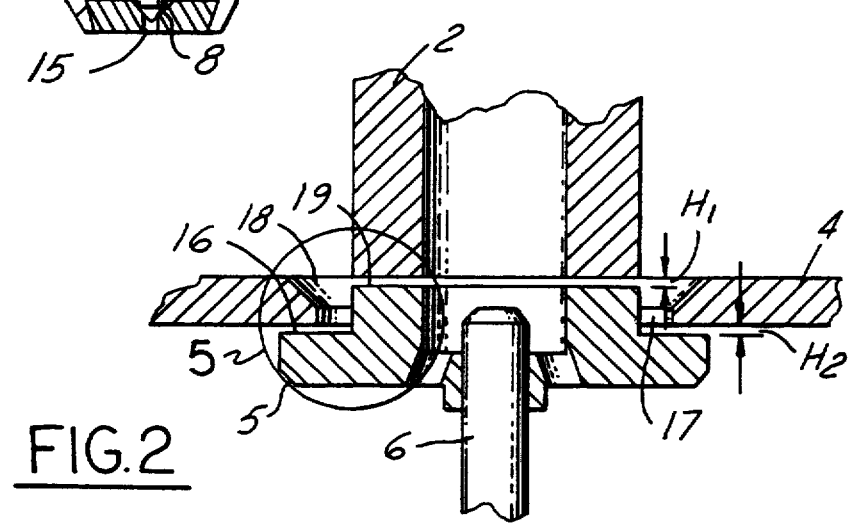
FIG. 2 is a detailed sectional view of the bottom area of the magnet needed to explain some important features of the invention.

The magnetic circuit is defined by parts 1, 2, 4, 5, of which parts 1, 2, 4 define the stator. FIG. 2 shows the bottom of the magnetic circuit, when coil 3 is not energized so that the fuel injector is closed. When coil 3 is energized, axial magnetic forces develop through gaps $H_1$ and $H_2$ that act to close the gaps. If these forces are sufficiently large, armature 5 is pulled against central magnetic pole 2, lifting needle 8 and opening nozzle 15, so that fuel can now flow and be sprayed from nozzle 15. The armature abutment is on a central surface 19, substantially aligned with its largest mass distribution and with its most stiff portion in such a way that oscillations resulting from the impact are reduced from those that would originate if there were abutment on an external surface of larger diameter, such as 16. For increasing the mechanical impact resistance of the two softer magnetic parts, armature 5 and central pole 2 have respective thin platings 21, 22 of harder non-magnetic material. Therefore, when the injector is fully open, there is, from a magnetic point of view, an actual residual magnetic gap confronting abutment surface 19 and a thicker actual residual magnetic gap confronting surface 16.

With reference to FIG. 2 some important features of the present invention can now be explained. The largest forces that can be obtained from the magnet correspond to a condition of flux saturation in the central pole, which has the smallest cross section in the circuit. A decrease in the reluctance of gap $H_2$ with respect to gap $H_1$, by, for example, an enlargement of surface 16, is not convenient because there would be an increase of the mass of the armature with a negligible increase in the magnetic force. Also, experimental evidence has demonstrated that the best solution shows a substantial equality of the reluctances of the two axial gaps. In order to have the largest axial forces, the magnetic flux is needed to pass almost completely through the axial gaps. Pole washer 4 therefore has a chamfer 18 to substantially minimize the flux leakage between itself and central magnetic pole 2, and a central bore 17, so as to substantially minimize the flux bypassing gap $H_2$. Therefore, the magnetic circuit reluctance between pole washer 4 and central magnetic pole 2 at the region of the lower end face of the central magnetic pole and the central through-hole in pole washer 4 is at least ten times greater than that at either of the two axial gaps.

Figure 3:
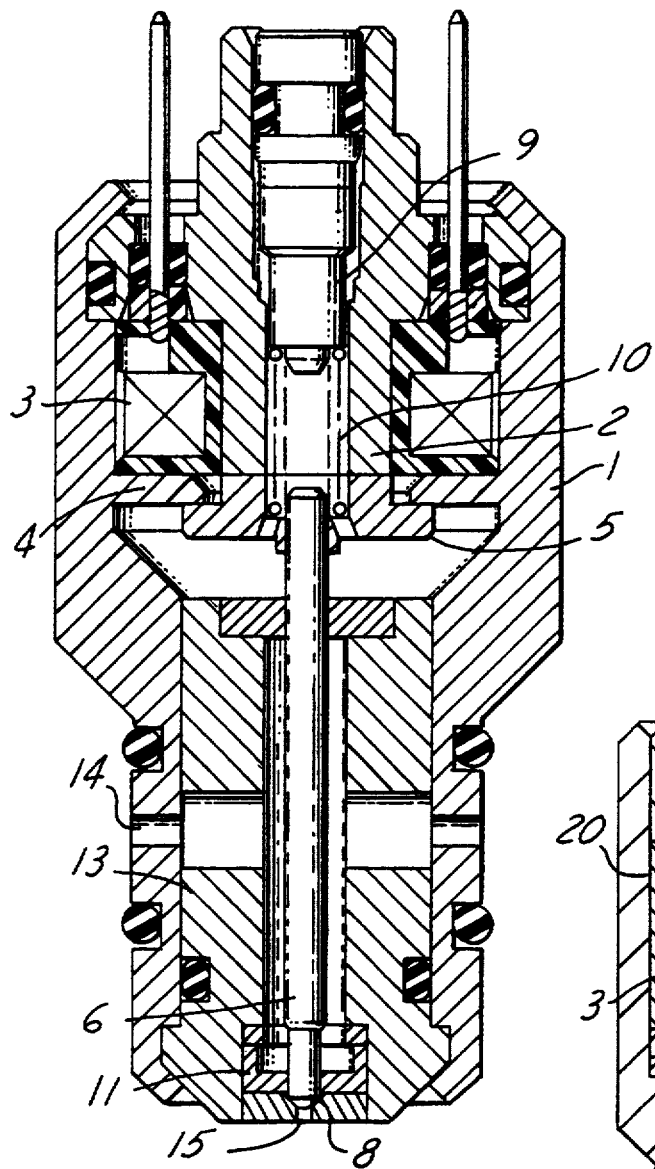
FIG. 3 and FIG. 4 are axial sectional views of different embodiments.
Figure 4:
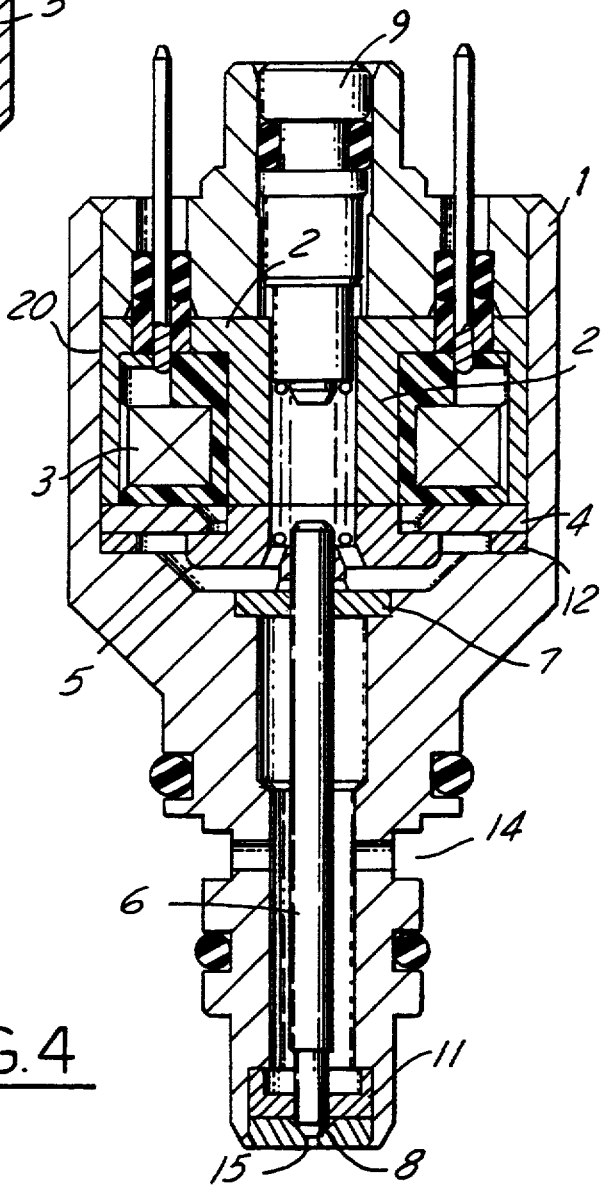

FIGS. 3 and 4 are two different embodiments using the same inventive concepts that have been described above. FIG. 3 has the pole washer 4 as an integrated part of the housing, and the coil is assembled through the top of the housing, which is thereafter deformed to hold the coil in place. In FIG. 4, the housing 1 is a non-magnetic shell and therefore not a part of the magnetic circuit that conducts magnetic flux from solenoid coil 3. The central magnetic pole 2 forms a central portion of a ferromagnetic part 20 which extends from pole 2 across the top of the solenoid coil and then downwardly along the outside of the solenoid coil and into abutment with the outer perimeter of pole washer 4. In FIG. 4, the stator comprises parts 20 (which includes 2) and 4.

What is claimed is:

1. A fuel injector having a longitudinal axis and comprising:
   A) an external housing for providing a cavity;
   B) a solenoid coil disposed within said cavity;
   C) a magnetic circuit that conducts magnetic flux produced by energization of said solenoid coil and comprises,
      i) a ferromagnetic stator, and
      ii) a ferromagnetic armature that executes longitudinal reciprocation relative to said stator in response to the energization and de-energization of said solenoid coil;
   D) valve means that is operated by the longitudinal reciprocation of said ferromagnetic armature to open and close a flow path through the fuel injector;
   E) said stator comprising,
      i) a ferromagnetic pole washer that is toward said armature and that has a through-hole at its center, and
      ii) a central magnetic pole comprising a through-bore extending coaxially within said housing to terminate in a downwardly facing ring-shaped end face proximate and coaxial with the through-hole in said pole washer;
   F) an adjusting pin and an elastic biasing means disposed within said through-bore of said central magnetic pole such that said elastic biasing means is disposed between said adjusting pin and said armature, and said adjusting pin is positionable axially within said through-bore to set the force exerted by said elastic biasing means on said armature;
   G) said armature comprising,
      i) an upwardly facing ring-shaped end face proximate and coaxially facing the downwardly facing ring-shaped end face of said central magnetic pole, and
      ii) a further upwardly facing ring-shaped face proximate and coaxially facing a ring-shaped margin of a downwardly facing surface of said pole washer surrounding the through-hole in said pole washer,
   H) said armature being moved coaxially toward said stator upon energization of said solenoid coil; characterized in that:
   I) said upwardly facing ring-shaped end face of said armature and said downwardly facing ring-shaped end face of said central magnetic pole define a first axial gap between said stator and said armature:
   J) said further upwardly facing ring-shaped face of said armature and said ring-shaped margin of said downwardly facing surface of said pole washer surrounding the through-hole in said pole washer define a second axial gap between said stator and said armature such that said axial gaps tend to reduce upon energization of said solenoid coil;
   K) the maximum radial dimension of said armature from said longitudinal axis is substantially less than the radial dimension of said cavity within which said solenoid coil is disposed; and
   L) motion of said armature toward said stator is arrested by abutment of said upwardly facing ring-shaped end face of said armature with said downwardly facing ring-shaped end face of said central magnetic pole and not by abutment of said further upwardly facing ring-shaped face of said armature with said ring-shaped margin of said downwardly facing surface of said pole washer surrounding the through-hole in said pole washer.

2. A fuel injector as set forth in claim 1 also characterized in that said pole washer is disposed perpendicular to said longitudinal axis of the fuel injector.

3. A fuel injector as set forth in claim 2 further characterized in that said further upwardly facing ring-shaped face of said armature is on a flange of said armature that is perpendicular to said longitudinal axis.

4. A fuel injector as set forth in claim 3 further characterized in that the magnetic circuit reluctance of said first axial gap is substantially equal to that of said second axial gap.

5. A fuel injector as set forth in claim 4 further characterized in that the magnetic circuit reluctance between said pole washer and said central magnetic pole at the region of said end face of said central magnetic pole and the through-hole in said pole washer is at least ten times greater than that at said first axial gap and at least ten times greater than that at said second axial gap.

6. A fuel injector as set forth in claim 1 further characterized by thin layers of harder plating covering those portions of said central magnetic pole and said armature that abut each other for imparting increased impact resistance to those portions and for also guaranteeing a residual actual gap in the magnetic circuit when those two portions are in abutment with each other.

7. A fuel injector as set forth in claim 1 further characterized in that said pole washer is an integral part of said housing.

8. A fuel injector as set forth in claim 1 further characterized in that said pole washer is a separate part assembled into said housing.

9. A fuel injector as set forth in claim 1 further characterized in that a portion of said housing is ferromagnetic and forms a portion of said stator.

10. A fuel injector as set forth in claim 1 further characterized in said housing is non-ferromagnetic so as to form no portion of said stator.

* * * * *